United States Patent [19]

Speranza et al.

[11] 4,376,832

[45] Mar. 15, 1983

[54] CATALYST-SOLVENT SYSTEM FOR POLYESTER-BASED POLYURETHANE FOAMS COMPRISING N-BUTYLMORPHOLINE AND N,N'-DIMETHYLPIPERAZINE AND THE SOLVENT

[75] Inventors: George P. Speranza; Robert L. Zimmerman, both of Austin, Tex.

[73] Assignee: Texaco Inc., White Plains, N.Y.

[21] Appl. No.: 328,291

[22] Filed: Dec. 7, 1981

[51] Int. Cl.³ .............................................. C08G 18/14
[52] U.S. Cl. ................................ 521/115; 252/426; 521/116; 521/129; 528/49; 528/53
[58] Field of Search ....................... 521/115, 116, 129; 528/49, 53; 252/426

[56] References Cited

U.S. PATENT DOCUMENTS

| | | | |
|---|---|---|---|
| 3,645,925 | 2/1972 | Speranza et al. | 521/115 |
| 3,925,582 | 12/1975 | Sample et al. | 528/49 |
| 4,012,445 | 3/1977 | Priest et al. | 528/49 |
| 4,326,042 | 4/1982 | Zimmerman | 521/115 |

*Primary Examiner*—Maurice J. Welsh
*Attorney, Agent, or Firm*—Jack H. Park; Kenneth R. Priem; David L. Mossman

[57] ABSTRACT

N-butylmorpholine and N,N'-dimethylpiperazine may be used together as a catalyst system in an activator solution to give finer, more uniform cells to polyester-based polyurethane foams if a solvent is employed. It was surprisingly discovered that the components must be used together as a catalyst-solvent system to avoid the disadvantages observed when one of the components is changed or left out. For example, if the solvent were not present in the activator solution in proportions of at least 1 wt. %, the activator solution would not be homogeneous.

20 Claims, No Drawings

CATALYST-SOLVENT SYSTEM FOR POLYESTER-BASED POLYURETHANE FOAMS COMPRISING N-BUTYLMORPHOLINE AND N,N'-DIMETHYLPIPERAZINE AND THE SOLVENT

CROSS-REFERENCE TO RELATED APPLICATION

U.S. Pat. No. 4,326,042 issued Apr. 20, 1982, relates to a polyester-based polyurethane foam catalyst system comprising N-methoxypropylmorpholine, N-butylmorpholine and N,N'-dimethylpiperazine.

BACKGROUND OF THE INVENTION

1. Field of the Invention

The invention pertains to the field of urethane catalysts and is more particularly related to catalyst systems employing morpholine and piperazine derivatives in a homogeneous activator solution.

2. Description of Related Art

The use of a catalyst in preparing polyurethanes by the reaction of a polyisocyanate, a polyol and perhaps other ingredients is known. The catalyst is employed to promote at least two, and sometimes three major reactions that must proceed simultaneously and competitively at balanced rates during the process in order to provide polyurethanes with the desired physical characteristics. One reaction is a chain-extending isocyanate-hydroxyl reaction by which a hydroxyl-containing molecule is reacted with an isocyanate-containing molecule to form a urethane. This increases the viscosity of the mixture and provides a polyurethane containing secondary nitrogen atoms in the urethane groups. A second reaction is a crosslinking isocyanate urethane reaction by which an isocyanate-containing molecule reacts with a urethane group containing a secondary nitrogen atom. The third reaction which may be involved is an isocyanate-water reaction by which an isocyanate-terminated molecule is extended and by which carbon dioxide is generated to blow or assist in the blowing of foam. This third reaction is not essential if an extraneous blowing agent, such as a halogenated, normally liquid hydrocarbon, carbon dioxide, etc., is employed, but is essential if all or even part of the gas for foam generation is to be generated by this in-situ reaction (e.g., in the preparation of "one-shot" flexible polyurethane foams).

The reactions must proceed simultaneously at optimum balanced rates relative to each other in order to obtain a good foam structure. If carbon dioxide evolution is too rapid in comparison with chain extension, the foam will collapse. If the chain extension is too rapid in comparison with carbon dioxide evolution, foam rise will be restricted, resulting in a high density foam with a high percentage of poorly defined cells. The foam will not be stable in the absence of adequate crosslinking.

It has long been known that tertiary amines are effective for catalyzing the second crosslinking reaction. Typical amines of this type are found in U.S. Pat. Nos. 4,012,445; 3,925,268; 3,786,005; 4,011,223; 4,048,107; 4,038,210, 4,033,911; 4,026,840; 4,022,720 and 3,912,689. However, many amines of this class have a strong amine odor which is carried over to the polyurethane foam.

Aminoamides may also be used as urethane catalysts such as the N,N-bis(3-dimethylaminopropyl)acetamide of U.S. Pat. No. 3,234,153. Morpholine derivatives as urethane catalysts are described in U.S. Pat. No. 3,645,925 which discloses 4,4'-dimorpholinodiethylether and U.S. Pat. No. 4,228,248 which uses certain N-alkoxyalkyl morpholines. A method for making N-alkylmorpholines, from which some of the previously described catalysts may be made, is described in U.S. Pat. No. 3,087,928.

In still other cases, some tertiary amines impart a color to the product foam known as "pinking" and/or cause or fail to prevent undue foam shrinkage. For example, N-methoxypropylmorpholine is an amine catalyst which will produce a pink foam.

In addition to problems of odor, pinking, etc., other tertiary amines suffer still further deficiencies. For example, in some instances the compounds are relatively high in volatility leading to obvious safety problems. In addition, some catalysts of this type do not provide sufficient delay in foaming, which delay is particularly desirable in molding applications to allow sufficient time to situate the preform mix in the mold. Yet other catalysts, while meeting specifications in this area, do not yield foams with a desirable tack-free time. In addition, some catalysts of this type are solids causing handling problems. In many cases, blends of catalysts containing different tertiary amine groups must be utilized in order to achieve the desired balance between gelling and flowing of foams. Lastly, some catalysts of this type cannot be used to form the desired polyurethane foam, such as a low-density foam, say of the polyester type.

The manufacture of polyester urethane foams frequently employs an activator solution which is a blend of the catalyst, surfactant and water to be used in making the foam. The use of an activator solution reduces the number of streams that must match up at the mixing head thereby cutting down on mixing adjustment problems. However, if an activator solution is used it must be homogeneous; that is, it must not separate into different phases, to function properly in the foam formulation. If a homogeneous activator solution is used, it must have a low viscosity so that it can be easily pumped to the mixing head. If a homogeneous activator solution is not employed, the materials would have to be pumped separately to the mixing head. This results in foam cells that are not as fine or as uniform as when an activator solution is used. N-butylmorpholine is an example of an amine catalyst which does not give a homogeneous activator solution.

U.S. Pat. No. 4,326,042 describes a three-part catalyst system comprising N-methoxypropylmorpholine, N-butylmorpholine and N,N'dimethylpiperazine which gives a homogeneous activator solution. However, it would be desirable if the total amount of catalyst could be reduced, especially the N-methoxypropylmorpholine component which is difficult to make.

It would therefore be a substantial advance in the art if an amine catalyst or catalyst system were discovered which would overcome the disadvantages of the prior art.

SUMMARY OF THE INVENTION

The invention concerns a catalyst-solvent system for use in reacting an organic polyisocyanate with an organic polyester polyol to produce a polyurethane, the catalyst-solvent system comprising catalytic amounts of N-butylmorpholine and N,N'-dimethylpiperazine and a solvent.

DETAILED DESCRIPTION OF THE PREFERRED EMBODIMENTS

Generally, in the preparation of polyester-based urethane foams it is desirable to use an activator solution (surfactants, water and amine catalyst). By using activator solutions foams with finer, more uniform cells are obtained than when each material is pumped separately to the foam machine head. The catalyst must also give a white foam (no discoloration) and ideally it should have a low odor. We have found that a blend of N-butylmorpholine (60–85%), N,N'-dimethylpiperazine (3–15%) and solvent (7–25%) fills all the above requirements for a good catalyst. On the basis of the entire activator solution, the solvent portion should be in the range of 1 to 6 weight percent.

Generally, the solvents useful in this invention are those miscible with N-butylmorpholine and N,N'-dimethylpiperazine and which give a homogeneous activator solution. It is anticipated that many organic compounds well known as solvents would be useful in making a homogeneous activator solution with the catalysts of interest. In particular, solvents which could be expected to be successfully employed in the method of this invention include amides, esters, cyclic amides, cyclic esters, ethers and cyclic ethers such as dioxane and tetrahydrofuran. Esters, ethers and amides with alcoholic substituents could also be expected to be useful. Specific compounds include caprolactone, diglyme, dimethyl formamide and caprolactam.

Other, more specific, solvents useful in the invention are alkoxylated alcohols which are well known compounds. One source of these alkoxylated alcohols is the JEFFERSOL ® glycol ethers sold by Texaco Chemical Co. Surprisingly, not all alkoxylated alcohols provided a homogeneous activator solution at the same concentration, as will be shown in the examples. For instance, ethoxylated methanol (ethylene glycol monomethyl ether) is unsatisfactory at low concentrations. However, di- and tripropylene glycol monomethyl ethers are satisfactory if the concentration is high enough. The alcohols may be defined by the formula

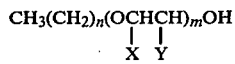

where n is zero or greater, m is 1 or greater, X and Y are hydrogen or lower alkyl, except that X and Y cannot both be lower alkyl simultaneously. Lower alkyl is defined as an alkyl group containing one to four carbon atoms. It is preferred that X be hydrogen and Y be methyl or hydrogen or vice versa, and it is especially preferred that both X and Y be hydrogen. It is further especially preferred that the alkoxylated alcohols be ethoxylated butanols, such as the ones utilized in the examples herein. These compounds are also referred to as ethers; e.g., ethylene glycol monobutyl ether and diethylene glycol monobutyl ether. As will be shown, a solvent is essential for the production of a homogeneous activator solution.

N-butylmorpholine, which may be made by the methods of U.S. Pat. No. 3,087,928 (incorporated by reference herein), is unsuitable when used alone because it will not give a homogeneous activator solution. Even when used in conjunction with N-methoxypropylmorpholine, the resulting activator solution is non-homogeneous. As used in this specification, "non-homogeneous" refers to a solution which will separate into at least two phases or layers which are not miscible. N-butylmorpholine is defined within this invention to be either N-sec-butylmorpholine or N-n-butylmorpholine.

The third component, N,N-dimethylpiperazine, has the disadvantage of being too much of a gelation catalyst for polyester polyurethanes. However, when used in small quantities it seems to be a crucial component for making activator solutions with N-butylmorpholine homogeneous.

The three components forming the catalyst-solvent system of this invention may be used as a group alone or in conjunction with other urethane catalysts known in the art to be catalytically active. It is especially preferred that the components of this invention be used in the following proportions, based on the total weight of the combined catalyst-solvent portion used: 60 to 85 weight percent of N-butylmorpholine, 3 to 15 weight percent of N,N'-dimethylpiperazine and 7 to 25 weight percent of solvent.

No limitations are placed on the number or kinds of other components that would ordinarily make up the activator solution such as, for example, surfactants, water, etc. Nor are any limitations placed on the other components used to make the ultimate polyurethane foam. Suitable polyols, isocyanates and co-catalysts may be found throughout the prior art, such as those listed in U.S. Pat. No. 4,228,248, incorporated by reference herein. While activator solutions seem to be used in industry only for polyester-based foam, it is anticipated within the scope of this invention that this particular, narrow catalyst system could possibly be used in other polyurethane applications, such as polyether-based foams.

The invention will be illustrated further with respect to the following specific examples, which are given by way of illustration and not as limitations on the scope of this invention.

EXAMPLE I

Table I summarizes the results of attempting to make homogeneous activator solutions by mixing the indicated components in the proportions shown. The numbers refer to parts by weight.

TABLE I

| PREPARATION OF ACTIVATOR SOLUTIONS | | | | | | | | | | |
|---|---|---|---|---|---|---|---|---|---|---|
| Formulation | A | B | C | D | E | F | G | H | I | J |
| FOMREZ ® M66-82[1] | 1.3 | 1.3 | 1.3 | 1.3 | 1.3 | 1.3 | 1.3 | 1.3 | 1.3 | 1.3 |
| FOMREZ 10-58[1] | 0.5 | 0.5 | 0.5 | 0.5 | 0.5 | 0.5 | 0.5 | 0.5 | 0.5 | 0.5 |
| N—coco morpholine | 1.2 | 1.2 | 1.2 | 1.2 | 1.2 | 1.2 | 1.2 | 1.2 | 1.2 | 1.2 |
| N,N—dimethylhexadecylamine | 0.3 | 0.3 | 0.3 | 0.3 | 0.3 | 0.3 | 0.3 | 0.3 | 0.3 | 0.3 |
| N,N'—dimethylpiperazine | 0.1 | 0.1 | 0.1 | 0.15 | 0.1 | 0.1 | 0.1 | 0.1 | 0.1 | 0.3 |
| N—butylmorpholine | 1.4 | 1.4 | 1.4 | 1.35 | 1.4 | 1.4 | 1.4 | 1.4 | 1.4 | — |
| JEFFERSOL EB[2] | 0.4 | 0.3 | 0.2 | — | — | — | — | — | — | — |
| JEFFERSOL EM[3] | — | — | — | — | 0.3 | — | — | — | — | — |
| JEFFERSOL DM[4] | — | — | — | — | — | 0.3 | — | — | — | — |
| JEFFERSOL EE[5] | — | — | — | — | — | — | 0.3 | — | — | — |
| JEFFERSOL DE[6] | — | — | — | — | — | — | — | 0.3 | — | — |
| JEFFERSOL DB[7] | — | — | — | — | — | — | — | — | 0.3 | 0.3 |
| Methoxyethylmorpholine | — | — | — | — | — | — | — | — | — | 0.7 |

TABLE I-continued

PREPARATION OF ACTIVATOR SOLUTIONS

| Formulation | A | B | C | D | E | F | G | H | I | J |
|---|---|---|---|---|---|---|---|---|---|---|
| Water | 3.7 | 3.7 | 3.7 | 3.7 | 3.7 | 3.7 | 3.7 | 3.7 | 3.7 | 3.7 |

[1] Organic surfactants sold by Witco Chemical Co.
[2] $CH_3CH_2CH_2CH_2OCH_2CH_2OH$ sold by Texaco Chemical Co.
[3] $CH_3OCH_2CH_2OH$ sold by Texaco Chemical Co.
[4] $CH_3OCH_2CH_2OCH_2CH_2OH$ sold by Texaco Chemical Co.
[5] $CH_2CH_2OCH_2CH_2OH$ sold by Texaco Chemical Co.
[6] $CH_3CH_2OCH_2CH_2OCH_2CH_2OH$ sold by Texaco Chemical Co.
[7] $CH_3CH_2CH_2CH_2OCH_2CH_2OCH_2CH_2OH$ sold by Texaco Chemical Co.

TABLE II

| Formulation | OBSERVATIONS Appearance |
|---|---|
| A | Homogeneous and very fluid |
| B | Homogeneous, low viscosity |
| C | Borderline on homogeneity |
| D | Viscous, not completely homogeneous |
| E | Slight gel, non-homogeneous |
| F | Slight gel, non-homogeneous |
| G | Slight gel, non-homogeneous |
| H | Slight gel, non-homogeneous |
| I | Homogeneous |
| J | Non-homogeneous |

Examples A, B, C and I show that a homogeneous activator solution can be prepared using the catalyst system of this invention. Example C illustrates the lower limit of ethoxylated butanol required to achieve homogeneity. Example D shows that a mixture of N-butylmorpholine and N,N'-dimethylpiperazine without a solvent does not give a homogeneous activator solution. Examples E, F, G and H demonstrate that closely related glycol ethers do not give a homogeneous activator, at least at the concentrations used in this example. Example J shows that methoxyethylmorpholine cannot be substituted for N-butylmorpholine.

While many solvents may form homogeneous activator solutions at high concentrations, eventually a point is reached after which the addition of solvent is uneconomic and perhaps even detrimental to the resulting foam. It is anticipated that one skilled in the art would be able to readily determine the best solvent concentration given the economic and performance characteristics required.

EXAMPLE II

Table III summarizes more attempts to make homogeneous activator solutions by mixing the indicated components in the parts-by-weight proportions shown.

As may be seen from Table III, the concentration of solvent has an effect on the homogeneity of the activator solution. For example, the solvents in formulations K, L and M are marginal when 0.3 parts by weight are used, but are acceptable when used in quantities of 0.5 or 0.4 parts by weight, see formulations P,Q,R,T,U and V.

It is also interesting to note that the solvent molecule needs to be of a certain size to be satisfactory in forming a homogeneous solution. For example, propylene glycol monomethyl ether forms a slightly gelled activator solution (formulation Z) while dipropylene glycol monomethyl ether gave a marginally acceptable solution (formulation L). However, the size limit is different for each type of solvent. For example, ethylene glycol monobutyl ether with a molecular weight of 118 made a homogeneous activator solution in formulation B is smaller than diethylene glycol monoethyl ether with a molecular weight of 134 (one more oxygen atom) but which gave a non-homogeneous solution in formulation H.

FOAMS USING THE CATALYST-SOLVENT SYSTEM

To prepare polyurethanes using the activator solution here, any aromatic polyisocyanate may be used. Typical aromatic polyisocyanates include m-phenylene diisocyanate, p-phenylene diisocyanate, polymethylene polyphenylisocyanate, 2,4-toluene diisocyanate, 2,6-toluene diisocyanate, dianisidine diisocyanate, bitolylene diisocyanate, naphthalene-1,3-diisocyanate, bis(4-isocyanatophenyl)methane, bis(3-methyl-4-isocyanatophenyl)methane, bis(3-methyl-4-isocyanatophenyl) methane, and 4,4'-diphenylpropane diisocyanate.

Greatly preferred aromatic polyisocyanates used in the practice of the invention are 2,4- and 2,6-toluene diisocyanates and methylene-bridged polyphenyl polyisocyanate mixtures which have a functionality of from about 2 to 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents; for example, U.S. Pat. Nos. 2,683,730; 2,950,263; 3,012,008; 3,344,162 and 3,362,979.

Most preferred methylene-bridged polyphenyl polyisocyanate mixtures used contain about 20 to about 100

TABLE III

PREPARATION OF ACTIVATOR SOLUTIONS

| Formulation[1] | K | L | M | N | O | P | Q | R | S | T | U | V | W | X | Y | Z |
|---|---|---|---|---|---|---|---|---|---|---|---|---|---|---|---|---|
| Caprolactone | 0.3 | — | — | — | — | 0.5 | — | — | — | 0.4 | — | — | — | — | — | — |
| Dipropylene glycol monomethyl ether | — | 0.3 | — | — | — | — | 0.5 | — | — | — | 0.4 | — | — | — | — | — |
| Tripropylene glycol monomethyl ether | — | — | 0.3 | — | — | — | — | 0.5 | — | — | — | 0.4 | — | — | — | — |
| Diglyme | — | — | — | 0.3 | — | — | — | — | 0.5 | — | — | — | — | — | — | — |
| Glycerine | — | — | — | — | 0.3 | — | — | — | — | — | — | — | — | — | — | — |
| Dimethyl formamide | — | — | — | — | — | — | — | — | — | — | — | — | 0.3 | — | — | — |
| Dipropylene glycol | — | — | — | — | — | — | — | — | — | — | — | — | — | 0.3 | — | — |
| Caprolactam | — | — | — | — | — | — | — | — | — | — | — | — | — | — | 0.3 | — |
| Propylene glycol monomethyl ether | — | — | — | — | — | — | — | — | — | — | — | — | — | — | — | 0.3 |
| Water | 3.7 | 3.7 | 3.7 | 3.7 | 3.7 | 3.7 | 3.7 | 3.7 | 3.7 | 3.7 | 3.7 | 3.7 | 3.7 | 3.7 | 3.7 | 3.7 |
| Comments | 2 | 2 | 2 | 2 | 4 | 1 | 1 | 1 | 1 | 1 | 1 | 1 | 2 | 3 | 1 | 3 |

[1] All formulations herein contain 1.3 parts FOMREZ M66-82, 0.5 parts FOMREZ 10-58, 0.3 parts N,N-dimethylhexadecylamine, 1.2 parts N-cocomorpholine, 1.32 parts N-butylmorpholine and 0.16 parts N,N'-dimethylpiperazine.
[2] Comment ratings are as follows: 1 = homogeneous, very fluid, good viscosity; 2 = boundry line, almost homogeneous; 3 = slight gel; 4 = non-homogeneous.

weight percent methylene diphenyldiisocyanate isomers, with the remainder being polymethylene polyphenyl polyisocyanates having higher functionalities and higher molecular weight. Typical of these are polyphenyl polyisocyanate mixtures containing about 20 to 100 weight percent methylene diphenyl diisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

The hydroxyl-containing polyol component which reacts with the isocyanate may suitably be a polyester polyol or perhaps a polyether polyol having a hydroxyl number ranging from about 700 to about 25, or lower. When it is desired to provide a flexible foam, the hydroxyl number is preferably in the range from about 25 to 60. For rigid foams, the hydroxyl number is preferably in the range from 350 to 700. Semi-rigid foams of a desired flexibility are provided when the hydroxyl number is intermediate to the ranges just given. Also for a flexible urethane foam, the polyol should preferably have an average functionality of from about 2 to about 4 and a molecular weight of from about 2,000 to about 6,000. For rigid foams, the functionality of the polyol component is preferably from about 4 to about 8.

When the polyol is a polyester, it is preferable to use as the polyester a resin having a relatively high hydroxyl value and a relatively low acid value made from the reaction of a polycarboxylic acid with a polyhydric alcohol. The acid component of the polyester is preferably of the dibasic or polybasic type and is usually free of reactive unsaturation, such as ethylenic groups or acetylenic groups. The unsaturation, such as occurs in the rings of such aromatic acids as phthalic acid, terephthalic acid, isophthalic acid, or the like, is non-ethylenic and non-reactive. Thus, aromatic acids may be employed for the acid component. Aliphatic acids, such as succinic acid, adipic acid, sebacic acid, azelaic acid, etc. may also be employed and are preferred. The alcohol component for the polyester should preferably contain a plurality of hydroxyl groups and is preferably an aliphatic alcohol, such as ethylene glycol, glycerol, pentaerthritol, trimethylolethane, trimethylolpropane, mannitol, sorbitol, or methyl glucoside. Mixtures of two or more of the above identified alcohols may be employed also if desired.

When the hydroxyl-containing component is a polyether polyol for use in flexible polyurethane foam, the polyol may be an alkylene oxide adduct of a polyhydric alcohol with a functionality of from about 2 to about 4. The alkylene oxide may suitably be ethylene oxide, propylene oxide, or 1,2-butylene oxide, or a mixture of some or all of these. The polyol will suitably have a molecular weight within the range of from about 2,000 to about 7,000. For flexible polyether polyurethane foams, the alkylene oxide is preferably propylene oxide or a mixture of propylene oxide and ethylene oxide.

The amount of hydroxyl-containing polyol compound to be used relative to the isocyanate compound in both polyester and polyether foams normally should be such that the isocyanate groups are present in at least an equivalent amount, and preferably, in slight excess, compared with the free hydroxyl groups. Preferably, the ingredients will be proportioned so as to provide from about 0.9 to about 1.5 mole equivalents of isocyanate groups per mole equivalent of hydroxyl groups. However, for certain shock absorbing foams we have found that by using the catalyst of our invention the mole equivalents of isocyanate to hydroxyl groups can be as low as 0.4.

When water is used, the amount of water, based on the hydroxyl compound, is suitably within the range of about 0.05 mole to about 10.0 moles per mole equivalent of hydroxy compound.

It is within the scope of the present invention to utilize an extraneously added inert blowing agent such as a gas or gas-producing material. For example, halogenated low-boiling hydrocarbons, such as trichloromonofluoromethane and methylene chloride, carbon dioxide, nitrogen, etc. may be used. The inert blowing agent reduces the amount of excess isocyanate and water that is required in preparing flexible urethane foam. For a rigid foam, the use of water is often avoided and the extraneous blowing agent is used exclusively. Selection of the proper blowing agent is well within the knowledge of those skilled in the art. See for example U.S. Pat. No. 3,072,082.

The catalysts discovered here which are useful in the preparation of flexible polyester or polyether polyurethane foams, based on the combined weight of the hydroxy-containing compound and polyisocyanate are employed in an amount of from about 0.03 to about 4.0 weight percent. More often, the amount of catalyst used is 0.06 to about 2.0 weight percent.

As mentioned before, catalysts of this invention may be used either alone or in a mixture with one or more other catalysts such as tertiary amines or with an organic tin compound or other polyurethane catalysts. The organic tin compound, particularly useful in making flexible foams may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Such tertiary amines include trialkylamines (e.g., trimethylamine, triethylamine), heterocyclic amines, such as N-alkylmorpholines (e.g., N-methylmorpholine, N-ethylmorpholine, etc.), 1,4-dimethylpiperazine, triethylenediamine, etc., and aliphatic polyamines, such as N,N,N'N'-tetramethyl-1,3-butanediamine.

Conventional formulation ingredients are also employed, such as, for example, foam stabilizers, also known as silicone oils or emulsifiers. The foam stabilizer may be an organic silane or siloxane. For example, compounds may be used having the formula:

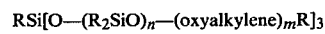

$$RSi[O-(R_2SiO)_n-(oxyalkylene)_mR]_3$$

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

In preparing a flexible foam, the ingredients may be simultaneously, intimately mixed with each other by the so-called "one-shot" method to provide a foam by a one-step process. In this instance, water should comprise at least a part (e.g. 10% to 100%) of the blowing agent. The foregoing methods are known to those skilled in the art, as evidenced by the following publication: duPont Foam Bulletin, "Evaluation of Some Polyols in One-Shot Resilient Foams", Mar. 22, 1960.

The invention will be illustrated further with respect to the following specific examples, which are given by way of illustration and not as limitations on the scope of this invention.

EXAMPLE III

In this example polyester-based urethane foams are prepared using the catalyst system of this invention. The results are summarized in Table II where the numbers again refer to parts by weight.

TABLE IV

| Polyol | | |
|---|---|---|
| FOMREZ ® 53[1] | 100 | 100 |
| Activator Solution | (B) | (I) |
| FOMREZ M77-82 | 1.3 | 1.3 |
| FOMREZ 10–58 | 0.5 | 0.5 |
| N-cocomorpholine | 1.2 | 1.2 |
| N,N-dimethylhexadecylamine | 0.3 | 0.3 |
| N,N'-dimethylpiperazine | 0.1 | 0.1 |
| N-butylmorpholine | 1.4 | 1.4 |
| JEFFERSOL EB | 0.3 | — |
| JEFFERSOL DB | — | 0.3 |
| Water | 3.7 | 3.7 |
| Isocyanate | | |
| Toluene diisocyanate | 48.4 | 48.4 |
| NCO/OH index | 1.10 | 1.10 |
| Reaction profile | | |
| Cream time (sec) | 8 | 10 |
| Rise time (sec) | 62 | 64 |
| Foam color after 1 hr at 180° C. | White | White |

[1]Polyester polyol sold by Witco Chemical Co.

It may be seen from Table IV that suitable foams may be made using the activator solutions of this invention. In addition to the characteristics noted above, these foams had the added advantage of being low in odor. Therefore, it may be seen that the catalyst-solvent formulation of this invention is particularly suited to form homogeneous activator solutions useful in the preparation of polyester-based urethane foams thereby minimizing mixing coordination problems. The activator solutions help produce foams with finer, more uniform cells, and it has been shown that the catalyst system of this invention produces foam that does not discolor and that has a low odor. Further, activator solutions may be made with viscosities low enough that they can be easily pumped to the mixing head. It should be remembered that each of the three components is essential if a homogeneous activator solution and, subsequently, a successful foam are to be produced.

We claim:

1. A catalyst-solvent system for use in reacting an organic polyisocyanate with an organic polyester polyol to produce a polyurethane, the catalyst-solvent system comprising catalytic amounts N-butylmorpholine and N,N'-dimethylpiperazine and a solvent of the formula $$CH_3(CH_2)_n(OCHCH)_mOH$$
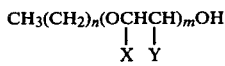

where n is zero or greater, m is 1 or greater, X and Y are hydrogen or lower alkyl axcept that X and Y cannot both be lower alkyl.

2. The catalyst-solvent system of claim 1 in which in the formula for the solvent, n is 3 or greater.

3. The catalyst-solvent system of claim 2 in which in the formula for the solvent, X and Y are both hydrogen.

4. The catalyst-solvent system of claim 3 in which in the formula for the solvent, m is 1 or 2.

5. The catalyst-solvent system of claims 1, 2, 3 or 4 in which N-butylmorpholine is 60 to 85 weight percent, N,N'-dimethylpiperazine is 3 to 15 weight percent and the solvent is 7 to 25 weight percent.

6. An activator solution for use in reacting with an organic polyisocyanate and an organic polyester polyol to produce a polyurethane, the activator solution comprising one or more surfactants, water, a solvent of the formula $$CH_3(CH_2)_n(OCHCH)_mOH$$
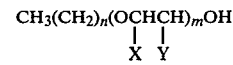

where n is zero or greater, m is 1 or greater, X and Y are hydrogen or lower alkyl except that X and Y cannot both be lower alkyl, and catalytic amounts of N-butylmorpholine and N,N'-dimethylpiperazine.

7. The activator solution of claim 6 in which in the formula for the solvent, n is 3 or greater.

8. The activator solution of claim 7 in which in the formula for the solvent, X and Y are both hydrogen.

9. The activator solution of claim 8 in which in the formula for the solvent, m is 1 or 2.

10. The activator solution of claims 6, 7, 8 or 9 in which N-butylmorpholine makes up 60 to 85 weight percent of the combined catalyst-solvent portion, N,N'-dimethylpiperazine makes up 3 to 15 weight percent of the combined catalyst-solvent portion and the solvent makes up 7 to 25 weight percent of the combined catalyst-solvent portion.

11. A method for producing a polyurethane which comprises reacting an organic polyisocyanate with an organic polyester polyol in the presence of a catalyst-solvent system comprising a catalytic amount of N-butylmorpholine, N,N'-dimethylpiperazine and a solvent of the formula $$CH_3(CH_2)_n(OCHCH)_mOH$$
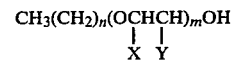

where n is zero or greater, m is 1 or greater, X and Y are hydrogen or lower alkyl except that X and Y cannot both be lower alkyl.

12. The method of claim 11 in which in the formula for the solvent, n is 3 or greater.

13. The method of claim 12 in which in the formula for the solvent, X and Y are both hydrogen.

14. The method of claim 13 in which in the formula for the solvent, m is 1 or 2.

15. The method for producing a polyurethane described in claims 11, 12, 13 or 14 in which N-butylmorpholine makes up 60 to 85 weight percent of the combined catalyst-solvent portion and N,N'-dimethylpiperazine makes up 3 to 15 weight percent of the combined catalyst-solvent portion and the solvent makes up 7 to 25 weight percent of the combined catalyst-solvent portion.

16. A method for producing a polyurethane which comprises reacting an organic polyisocyanate with an organic polyester polyol in the presence of an activator solution comprising one or more surfactants, water, and a solvent of the formula $$CH_3(CH_2)_n(OCHCH)_mOH$$
$$\phantom{CH_3(CH_2)_n(O}|\phantom{CH}|$$
$$\phantom{CH_3(CH_2)_n(OC}X\phantom{CH}Y$$

where n is zero or greater, m is 1 or greater, X and Y are hydrogen or lower alkyl except that X and Y cannot both be lower alkyl and catalytic amounts of N-butylmorpholine and N,N'-dimethylpiperazine.

17. The method of claim 16 in which in the formula for the solvent, n is 3 or greater.

18. The method of claim 17 in which in the formula for the solvent, X and Y are both hydrogen.

19. The method of claim 18 in which in the formula for the solvent, m is 1 or 2.

20. The method for producing a polyurethane described in claims 16, 17, 18 or 19 in which N-butylmorpholine makes up 60 to 85 weight percent of the combined catalyst-solvent portion and N,N'-dimethylpiperazine makes up 3 to 15 weight percent of the combined catalyst-solvent portion and the solvent makes up 7 to 25 weight percent of the combined catalyst-solvent portion.

* * * * *